United States Patent [19]

Kim

[11] Patent Number: 5,379,284
[45] Date of Patent: Jan. 3, 1995

[54] COMPACT DISK PLAYER HAVING AN INTERMEDIATE MEMORY STORAGE DEVICE

[75] Inventor: Dong G. Kim, Seoul, Rep. of Korea

[73] Assignee: Hyundai Electronics Industries Co., Ltd., Kyoungki-do, Rep. of Korea

[21] Appl. No.: 132,884

[22] Filed: Oct. 7, 1993

[30] Foreign Application Priority Data

Oct. 12, 1992 [KR] Rep. of Korea ............... 92-18682

[51] Int. Cl.⁶ .............................................. G11B 7/00
[52] U.S. Cl. ................... 369/44.32; 369/47; 369/32; 369/124
[58] Field of Search ............ 369/47, 44.32, 54, 59, 369/48, 32, 50, 51, 124; 358/341, 342, 343; 360/39, 55, 61, 10.1, 9.1

[56] References Cited

U.S. PATENT DOCUMENTS

| Re. 33,462 | 11/1990 | Suzuki et al. | 371/37.5 |
|---|---|---|---|
| 4,816,928 | 3/1989 | Sasaki et al. | 360/9.1 |
| 4,964,109 | 10/1990 | Yoshioka | 369/51 |
| 5,148,417 | 9/1992 | Wong et al. | 369/44.32 |
| 5,200,944 | 4/1993 | Souma | 369/48 |
| 5,224,089 | 6/1993 | Matsumura et al. | 369/124 |
| 5,235,575 | 8/1993 | Han | 369/44.32 |

FOREIGN PATENT DOCUMENTS 1-164188 6/1989 Japan .

Primary Examiner—Aristotelis Psitos
Assistant Examiner—Thang V. Tran
Attorney, Agent, or Firm—Foley & Lardner

[57] ABSTRACT

A compact disk player comprising a pickup for reading data on a compact disk, a servo control device for controlling the pickup and a digital signal processing unit for processing the data on the compact disk read by the pickup in a digital form and generating a predetermined clock. According to the invention, the compact disk player comprises a microcomputer for generating first and second clocks, a plurality of addresses and a plurality of clock enable signals and controlling the servo control device upon sensing a focus error from the pickup, the first clock being active high under a normal condition, the second clock being active high upon sensing the focus error from the pickup, a clock generator for generating a reference clock, a clock selection circuit for selecting one of the clocks from the digital signal processing unit and the clock generator in response to the first and second clocks from the microcomputer, a RAM section for, alternately, storing data from the digital signal processing unit and outputting the stored data in response to the addresses and the clock enable signals from the microcomputer and the selected clock from the clock section circuit, and a D/A converter for converting the data from the RAM section into an analog signal under the control of the microcomputer.

4 Claims, 3 Drawing Sheets

COMPACT DISK PLAYER HAVING AN INTERMEDIATE MEMORY STORAGE DEVICE

BACKGROUND OF THE INVENTION

1. Field of the Invention

The present invention relates in general to compact disk players, and more particularly to a compact disk player of the data storage type in which data on a compact disk is stored in a RAM section and the stored data is outputted from the RAM section when the reproduction of the data on the compact disk is discontinued, so that a sound can be prevented from being discontinued due to a vibration such as jolt of vehicles.

2. Description of the Prior Art

Conventional compact disk players comprise pickup means for rotating a compact disk and scanning a laser beam on the compact disk being rotated, servo control means for controlling the pickup means, radio frequency (RF) processing means for converting an analog signal corresponding to an amount of the laser beam reflected on the compact disk into a digital signal, digital signal processing (DSP) means for processing the digital signal from the RF processing means under a control of a microcomputer and controlling the servo control means in accordance with the processed signal, digital/analog (D/A) conversion means for converting the processed signal from the DSP means into an analog signal, and amplification means for amplifying the analog signal from the D/A conversion means and outputting the amplified signal to a speaker. One example of this form of compact disk players is shown in a block form in FIG. 1.

As shown in FIG. 1, the conventional compact disk player comprises a pickup 10 being operated under a control of a servo control device 20. The pickup 10 includes a CD motor 11 for rotating a compact disk 12 under the control of the servo control device 20. In the pickup 10, a laser beam 13 is vertically scanned on the surface of the compact disk 12 being rotated by the CD motor 11. A RF processor 30 is adapted to convert an analog signal corresponding to an amount of the laser beam 13 reflected on the compact disk 12 into a digital signal. A DSP unit 40 is adapted to process the digital signal from the RF processor 30 under a control of a microcomputer 50 and control the servo control device 20 in accordance with the processed signal. The processed signal from the DSP unit 40 is also applied to a D/A converter 60, which converts the applied signal into an analog signal and outputs the analog-converted signal to an amplifier 70. Also, the output signal from the DSP unit 40 is applied to the microcomputer 50. In response to the output signal from the DSP unit 40, the microcomputer 50 controls a display unit (not shown). The amplifier 70 acts to amplify the analog signal from the D/A converter 60 and output the amplified signal to a speaker SP.

In the above-mentioned conventional compact disk player, data is recorded in the form of high and low levels on the compact disk 12, resulting in reduction in a noise component. Also, since the data recorded on the compact disk 12 is reproduced by reading the amount of the laser beam 13 reflected on the compact disk 12, the compact disk 12 is prevented from being worn away. As a result, the life of the compact disk 12 is semi-permanent. However, in the case where the conventional compact disk player is used in vehicles, the focus of the laser beam 13 may be not constant due to jolt of the vehicles or an unsteady state of load surface. For this reason, the pickup 10 cannot smoothly read the data from the compact disk 12, resulting in a discontinuity of a sound. This degrades the reliability of manufactured goods.

Also, in video tape recorders (VTRs) or video disk players, a video format signal is read from a video memory, being delayed by one frame. For the purpose of avoiding an error in reproducing a video picture, a horizontal synchronizing signal HS' is generated being shifted by one period of an original horizontal synchronizing signal HS of a composite vidoe signal. X and Y address counters generate X and Y addresses in response to the horizontal synchronizing signals HS and HS'. The video format signal is stored in a location of the video memory corresponding to the X and Y addresses from the X and Y address counters. As a result, the video picture can be reproduced with no damage. One example of these techniques is shown in Japanese Patent Laid-open Publication No. Heisei 1-164188. However, the above Japanese Patent is desirable to read the video format signal from the video memory with no error, but has the disadvantage that it cannot propose how to cope with the faulty operation of the pickup (head) resulting from the vibration such as the jolt of vehicles.

SUMMARY OF THE INVENTION

Therefore, the present invention has been made in view of the above problem, and it is an object of the present invention to provide a compact disk player of the data storage type in which data from a DSP unit is stored in a RAM section and the stored data is outputted from the RAM section under a control of a microcomputer when no data is outputted from the DSP unit due to an error in a pickup, so that a sound can be prevented from being discontinued due to a vibration such as jolt of vehicles, thereby allowing the user to normally listen to the sound without knowing a discontinuity of the sound.

In accordance with the present invention, the above and other objects can be accomplished by a provision of a compact disk player comprising a pickup for reading data on a compact disk, a servo control device for controlling the pickup and a digital signal processing unit for processing the data on the compact disk read by said pickup in a digital form and generating a predetermined clock, wherein the improvement comprises control means for generating first and second clocks, a plurality of addresses and a plurality of clock enable signals and controlling said servo control device upon sensing a focus error from said pickup, the first clock being active high under a normal condition, the second clock being active high upon sensing the focus error from said pickup; clock generation means for generating a reference clock; clock selection means for selecting one of the clocks from said digital signal processing unit and said clock generation means in response to the first and second clocks from said control means, said clock selection means selecting the predetermined clock from said digital signal processing unit under the normal condition and selecting the reference clock from said clock generation means when no data is outputted from said digital signal processing unit due to the focus error from said pickup; memory means for, alternately, storing data from said digital signal processing unit and outputting the stored data in response to the addresses and the clock enable signals from said control means and the selected clock from said clock selection means; and digital/analog conversion means for converting the data from said memory means into an analog signal under the control of said control means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
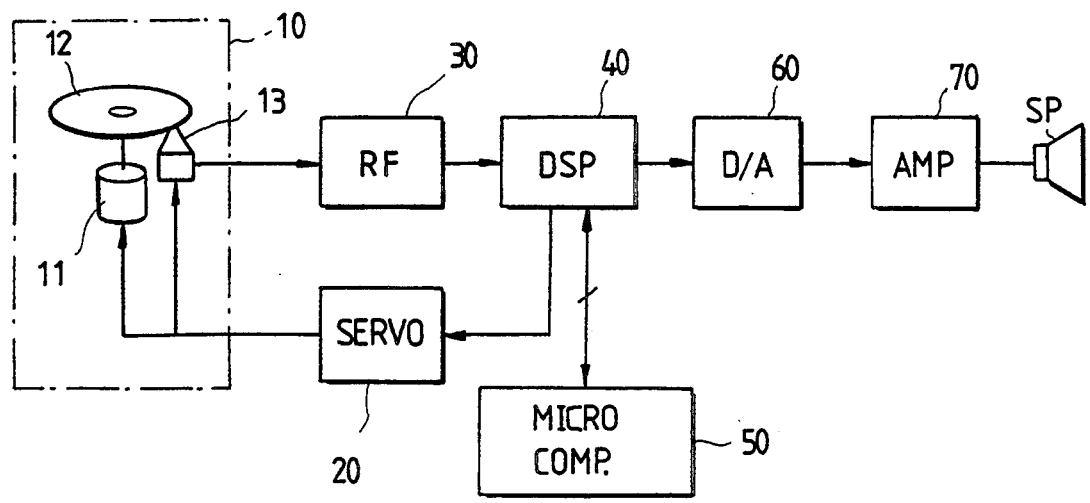
FIG. 1 is a block diagram of a conventional compact disk player.
Figure 2:
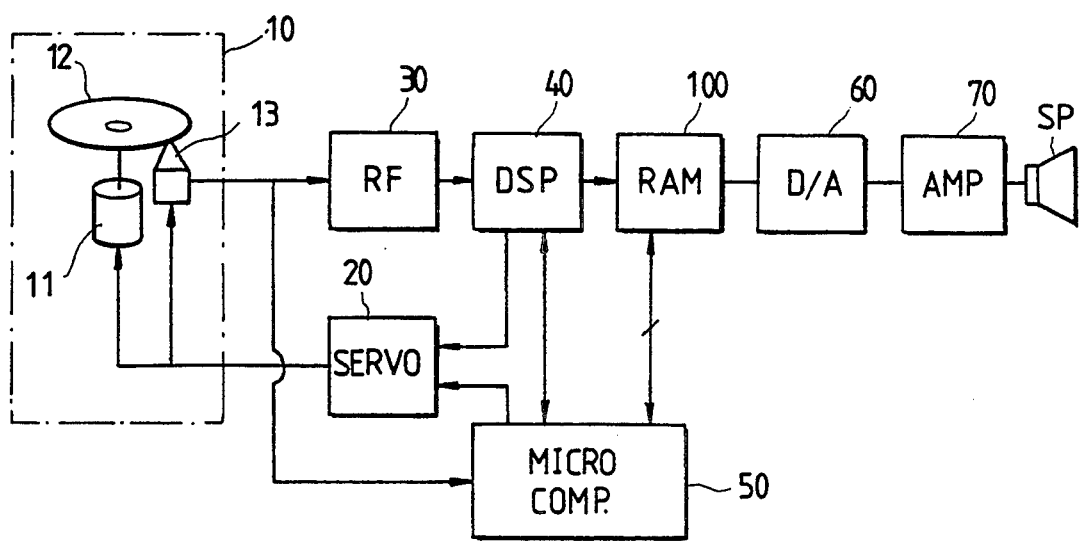
FIG. 2 is a block diagram of a compact disk player in accordance with the present invention.

Referring to FIG. 2, there is shown a block diagram of a compact disk player in accordance with the present invention. Some of parts in FIG. 2 are the same as those in FIG. 1. Therefore, like reference numerals designate like parts.

In the compact disk player, the DSP unit 40 is operated under the control of the microcomputer 50 to transfer the data from the compact disk 12 in the pickup 10 to the D/A converter 60.

A RAM section 100 is provided in the compact disk player to store the data from the DSP unit 40 and output the stored data to the D/A converter 60 under the control of the microcomputer 50 upon generation of a focus error in the pickup 10.

Figure 3:
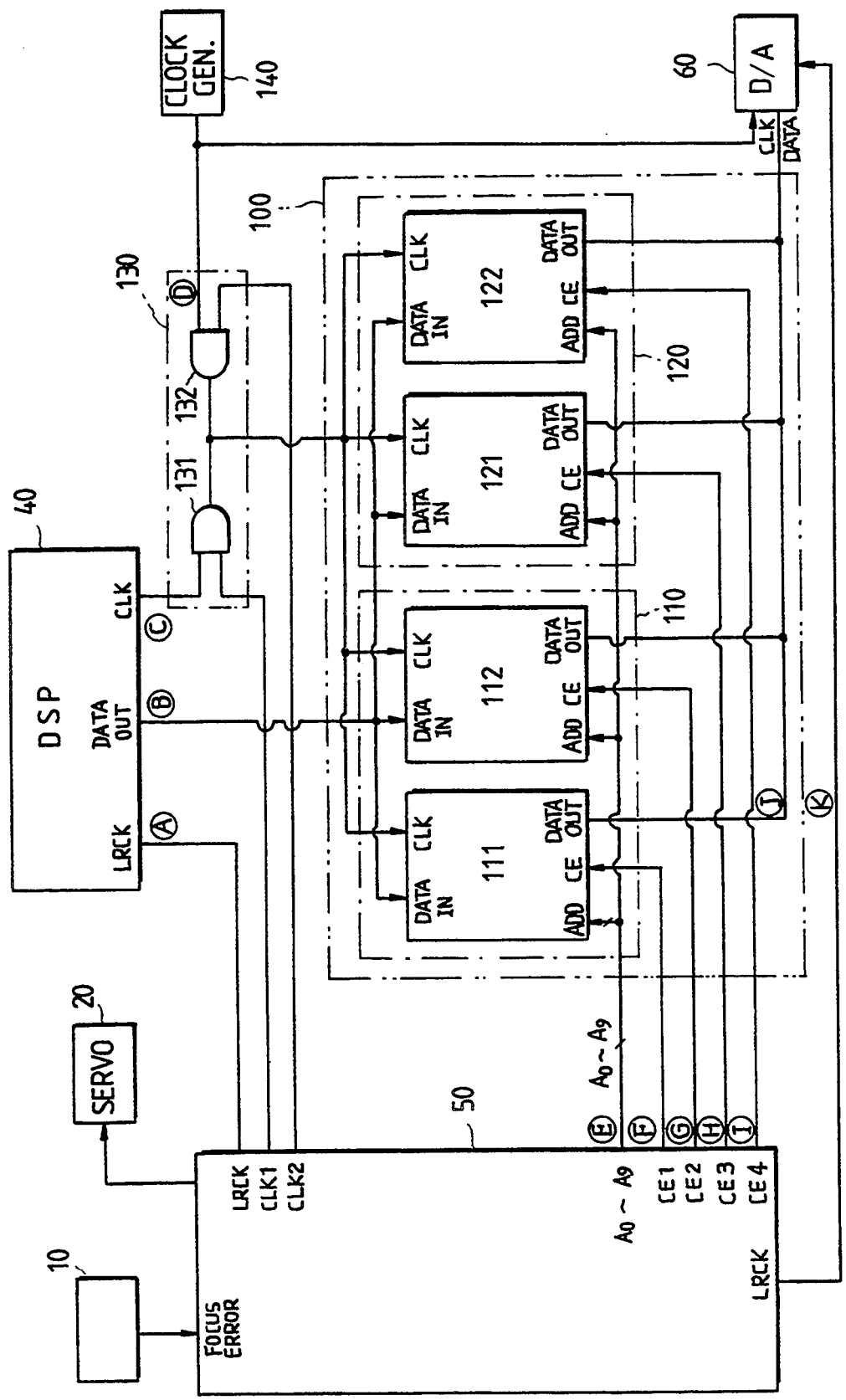
FIG. 3 is a detailed circuit diagram of the compact disk player in FIG. 2.

Referring to FIG. 3, there is shown a detailed circuit diagram of the compact disk player in FIG. 2. As shown in this drawing, the output data from the DSP unit 40 is applied to the RAM section 100. The data stored in the RAM section 100 is applied to the D/A converter 60. The RAM section 100 is provided with left and right channel RAM parts 110 and 120. The left channel RAM part 110 includes a pair of RAMs 111 and 112 for alternately storing and outputting the data. Similarly, the right channel RAM part 120 includes a pair of RAMs 121 and 122 for alternately storing and outputting the data.

The microcomputer 50 is adapted to generate clocks CLK1 and CLK2, addresses A0-A9 and a plurality of chip enable signals CE1-CE4 upon sensing the focus error from the pickup 10 and in response to a left or right channel clock LRCK from the DSP unit 40. The microcomputer also transfers the left or right channel clock LRCK from the DSP unit 40 to the D/A converter 60. The clocks CLK1 and CLK2 from the microcomputer 50 are applied to a clock selection circuit 130. The addresses A0-A9 from the microcomputer 50 are applied to the RAM section 100.

The clock selection circuit 130 is adapted to select a clock to a clock terminal CLK of the RAM section 100 in response to the clocks CLK1 and CLK2 from the microcomputer 50. The clock selection circuit 130 includes an AND gate 131 for ANDing the clock CLK1 from the microcomputer 50 and a clock CKL from the DSP unit 40 and outputting the ANDed signal as the clock to the clock terminal CLK of the RAM section 100, and an AND gate 132 for ANDing the clock CLK2 from the microcomputer 50 and a reference clock from a clock generator 140 and outputting the ANDed signal as the clock to the clock terminal CLK of the RAM section 100. The reference clock from the clock generator 140 is also applied to a clock terminal CLK of the D/A converter 60.

The operation of the compact disk player with the above-mentioned construction in accordance with the present invention will hereinafter be described in detail with references to FIGS. 4A to 4K which are timing diagrams of the signals from the components in FIG. 3.

Upon powering the compact disk player, the pickup 10 rotates the compact disk 12 and scans the laser beam on the compact disk 12 being rotated. The data read from the compact disk 12 is sensed as audio or video data by the RF processor 30 and the DSP unit 40 according to the amount of the laser beam reflected on the compact disk 12. As a result, the resultant data of, for example, a high level as shown in FIG. 4B is outputted from the DSP unit 40.

Figure 4:
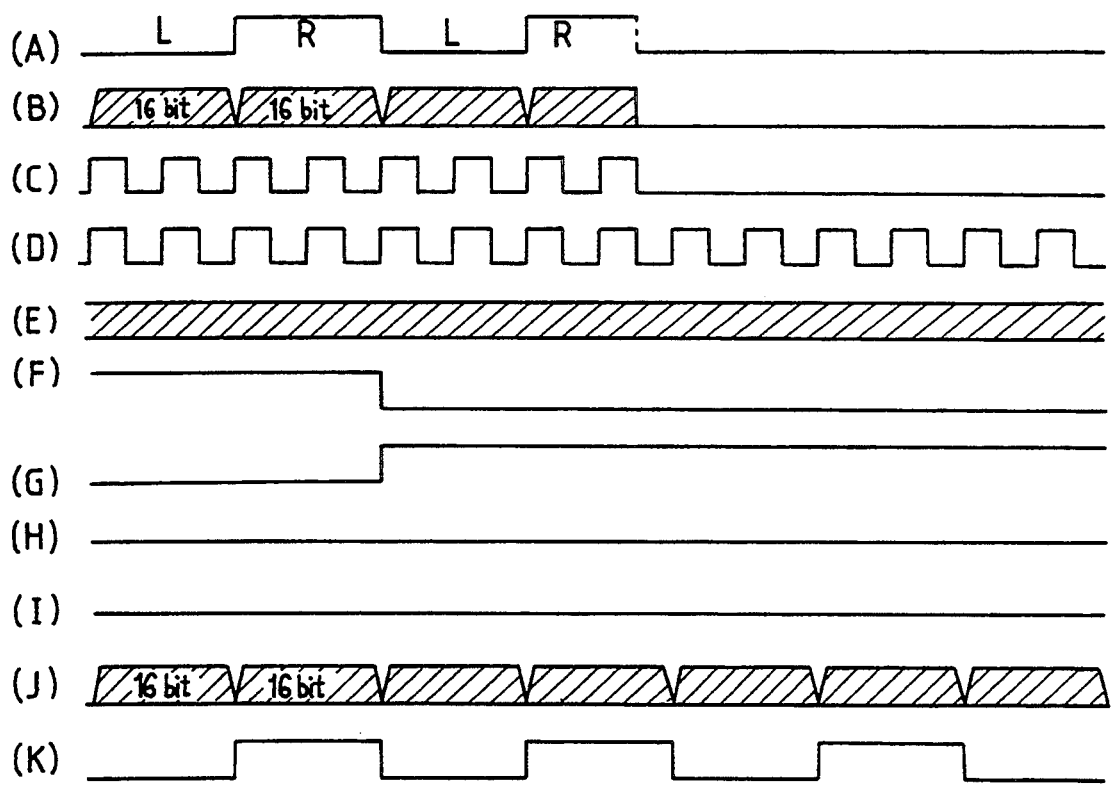
FIGS. 4A to 4K are timing diagrams of signals from components in FIG. 3.

The left or right channel clock LRCK as shown in FIG. 4A is applied from the DSP unit 40 to the microcomputer 50. The DSP unit 40 also applies the clock CLK as shown in FIG. 4C to the AND gate 131 of the clock selection circuit 130. At this time, the clock generator 140 generates the clock as shown in FIG. 4D and applies the generated clock to the AND gate 132 of the clock selection circuit 130. As shown in FIG. 4D, the clock from the clock generator 140 has the same period as that of the clock CLK as shown in FIG. 4C.

In a normal state, the microcomputer 50 outputs the clock CLK1 of a high level to the AND gate 131 of the clock selection circuit 130, thereby causing the AND gate 131 to output the clock CLK from the DSP unit 40 to the clock terminal CLK of the RAM section 100. At this time, the clock CLK2 from the microcomputer 50 is low.

Upon application of the data from DSP unit 40 to the RAM section 100, the microcomputer 50 generates the addresses A0-A9 as shown in FIG. 4E so that the data from the DSP unit 40 can be stored in locations of the RAM section 100 corresponding to the generated addresses. At the same time, the microcomputer 50 transfers the data from the DSP unit 40 to the D/A converter 60 through the RAM section 100 so that the data from the compact disk 12 can be outputted as an audio or video signal. In this case, the data from the compact disk 12 can be stored in the RAM section 100 because the servo control device 20 controls a speed of the pickup 10 under the control of the microcomputer 50.

Under this condition, in the case where the focus error is generated in the pickup 10 due to an inaccuracy of the focus of the laser beam 13 resulting from a vibration such as jolt of vehicles, the data output from the DSP unit 40 is stopped as shown in FIG. 4B and the clock output therefrom is stopped as shown in FIG. 4C. At this time, the microcomputer 50 outputs the clock CLK2 of a high level to the AND gate 132 of the clock selection circuit 130, thereby causing the AND gate 132 to output the clock from the clock generator 140 to the clock terminal CLK of the RAM section 100. As a result, the RAM section 100 continues to be operated.

As seen from FIGS. 4F and 4G, at that time that the clock enable signal CE2 of a high level as shown in FIG. 4G is applied from the microcomputer 50 to the RAM 112 under the condition that the data is outputted from the RAM 111 to the D/A converter 60 whereas the data is stored in the RAM 112, the data output from the RAM 111 is stopped whereas the data output from the RAM 112 is performed in reponse to the addresses from the microcomputer 50 from the moment that the data output is stopped. As a result, the data output can be performed with no discontinuity as shown in FIG. 4J. Although the data output from the DSP unit 40 is discontinued at an intermediate portion of a right channel interval as shown in FIGS. 4A to 4C, the clock enable signals CE1 and CE2 are changed in level before the intermediate portion as shown in FIGS. 4F and 4G. Namely, the clock enable signals CE1 and CE2 are synchronized with a falling edge of a right channel interval just before the discontinued right channel interval, so as to prevent the sound from being discontinued.

Of course, during the data output from the RAM 112, the microcomputer 50 controls the pickup 10 to be normally operated again and thus reads the data from the pickup 10 at a high speed. Then, the microcomputer 50 stores again the read data into the RAM 111. In this manner, the data storage and output are repeatedly performed whenever the reproduction of the data on the compact disk 12 is discontinued. Therefore, the user can normally listen to the sound without knowing the discontinuity of the sound at all. This has the effect of making the reliability of manufactured goods high.

The RAMs 121 and 122 in the right channel RAM part 120 are operated in the same manner as those of the left channel RAM part 110 to prevent the sound from being discontinued, and a description thereof will thus be omitted. Although the left and right channel RAM parts 110 and 120 have herein been used for the audio signal process, they may be used as first and second video RAM parts for a video signal process.

Although the preferred embodiments of the present invention have been disclosed for illustrative purposes, those skilled in the art will appreciate that various modifications, additions and substitutions are possible, without departing from the scope and spirit of the invention as disclosed in the acccompanying claims.

What is claimed is:

1. A compact disk player comprising a pickup for reading data on a compact disk, a servo control device for controlling the pickup and a digital signal processing unit for processing the data on the compact disk read by said pickup in a digital form and generating a predetermined clock, wherein the improvement comprises:

control means for generating first and second clocks, a plurality of addresses and a plurality of clock enable signals and controlling said servo control device upon sensing a focus error from said pickup, the first clock being active high under a normal condition, the second clock being active high upon sensing the focus error from said pickup;

clock generation means for generating a reference clock;

clock selection means for selecting one of the clocks from said digital signal processing unit and said clock generation means in response to the first and second clocks from said control means, said clock selection means selecting the predetermined clock from said digital signal processing unit under the normal condition and selecting the reference clock from said clock generation means when no data is outputted from said digital signal processing unit due to the focus error from said pickup;

memory means for, alternately, storing data from said digital signal processing unit and outputting the stored data in response to the addresses and the clock enable signals from said control means and the selected clock from said clock selection means; and digital/analog conversion means connected to said control means for converting the data from said memory means into an analog signal under the control of said control means.

2. A compact disc player as set forth in claim 1, wherein said clock selection means includes:

a first AND gate for AND gating the first clock from said control means and the predetermined clock from said digital signal processing unit and outputting a first AND gate signal as the clock to said memory means; and a second AND gate for AND gating the second clock from said control means and the reference clock from said clock generation means and outputting a second AND gate signal as the clock to said memory means.

3. A compact disk player as set forth in claim 1, wherein said memory means includes left and right channel RAM parts for stereo.

4. A compact disk player as set forth in claim 3, wherein each of said left and right channel RAM parts includes a pair of RAMs for alternately storing and ouputting the data.

* * * * *